United States Patent
Poppe et al.

(10) Patent No.: US 12,319,414 B2
(45) Date of Patent: Jun. 3, 2025

(54) SEAT RAIL SYSTEM FOR AN INTERIOR SPACE OF A VEHICLE

(71) Applicant: Airbus Operations GmbH, Hamburg (DE)

(72) Inventors: Andreas Poppe, Hamburg (DE); Hermann Benthien, Hamburg (DE)

(73) Assignee: Airbus Operations GmbH, Hamburg (DE)

( * ) Notice: Subject to any disclaimer, the term of this patent is extended or adjusted under 35 U.S.C. 154(b) by 524 days.

(21) Appl. No.: 17/870,018

(22) Filed: Jul. 21, 2022

(65) Prior Publication Data

US 2023/0027418 A1 Jan. 26, 2023

(30) Foreign Application Priority Data

Jul. 23, 2021 (EP) .................................. 21187333

(51) Int. Cl.
- *B64D 11/06* (2006.01)
- *B60N 2/08* (2006.01)
- *B64C 1/20* (2006.01)

(52) U.S. Cl.
CPC ........ *B64D 11/0696* (2013.01); *B60N 2/0818* (2013.01); *B64C 1/20* (2013.01)

(58) Field of Classification Search
CPC ............ B64D 11/0696; B64D 11/0639; B60N 2/0818; B64C 1/20
USPC .......................................... 248/424, 429, 430
See application file for complete search history.

(56) References Cited

U.S. PATENT DOCUMENTS

| | | | | |
|---|---|---|---|---|
| 10,464,445 B2* | 11/2019 | Trimble | ............. | B64D 11/0696 |
| 10,556,692 B2* | 2/2020 | Fuerstenberg | ..... | B64D 11/0696 |
| 2007/0018047 A1 | 1/2007 | Wodak | | |
| 2016/0356309 A1 | 12/2016 | Tsai | | |
| 2020/0086968 A1 | 3/2020 | Roth et al. | | |

FOREIGN PATENT DOCUMENTS

| | | |
|---|---|---|
| DE | 102005033048 B3 | 1/2007 |
| DE | 102016110022 A1 | 11/2017 |
| EP | 3626620 A1 | 3/2020 |

OTHER PUBLICATIONS

European Search Report; priority document.

* cited by examiner

*Primary Examiner* — Todd M Epps
(74) *Attorney, Agent, or Firm* — Greer, Burns & Crain, Ltd.

(57) ABSTRACT

A seat rail system for an interior space of a vehicle includes a seat rail having a plurality of attachment sockets arranged in a row along a longitudinal extension of the seat rail. Each attachment socket has an at least partly spheroid concave bearing surface. Two coupling openings are embedded in each concave bearing surface; an attachment stud having an at least partly spheroid or cylindroid convex bearing surface with a curvature corresponding to a curvature of the concave bearing surface of the attachment sockets. A coupling pin is arranged on or in the convex bearing surface and configured to enter one of the attachment openings to couple the attachment stud to the seat rail. A locking pin is configured to enter the respective other attachment opening through a through hole in the attachment stud and thereby lock the attachment stud to the seat rail.

10 Claims, 2 Drawing Sheets

SEAT RAIL SYSTEM FOR AN INTERIOR SPACE OF A VEHICLE

CROSS-REFERENCES TO RELATED APPLICATIONS

This application claims the benefit of the European patent application No. 21187333.6 filed on Jul. 23, 2021, the entire disclosures of which are incorporated herein by way of reference.

FIELD OF THE INVENTION

The present invention pertains to a seat rail system for attaching seats and other installations in an interior space of a vehicle.

BACKGROUND OF THE INVENTION

In interior spaces of transportation means, passenger seats and other installations are often fastened on rails, which are arranged in or at a floor. Such rails usually comprise arresting means arranged in a linear raster, which allow a flexible fastening of the respective installations at a desired location. To this end, lengthwise-slit open aluminum profiles are often used as rails, which may suffer during long-term use from corrosion due to deformation and high local pressure loads on paint surfaces. Sometimes expensive and heavy titanium rails are used to improve resistance against corrosion. There has been increased interest recently in hybrid variants that combine an aluminum body with an adapted rail crown.

Prior art document DE 10 2016 110 022 A1 discloses a seat rail system for an interior space of a vehicle. The seat rail system includes a seat rail having a top side with a plurality of raster openings and mechanically couplable with a cabin floor. The seat rail system further includes a plurality of holding devices positionable on the top side, each holding device being selectively engageable with at least one of the raster openings for arresting the holding device and configured for holding an object on the seat rail.

SUMMARY OF THE INVENTION

Against this background, it is an object of the present invention to find seat attachment solutions with reduced corrosion, weight and assembly effort.

According to one aspect of the invention, a seat rail system for an interior space of a vehicle comprises a seat rail having a plurality of attachment sockets arranged in a row along a longitudinal extension of the seat rail, wherein each attachment socket has an at least partly spheroid concave bearing surface, wherein two coupling openings are embedded in each concave bearing surface; an attachment stud having an at least partly spheroid or cylindroid convex bearing surface with a curvature corresponding to a curvature of the concave bearing surface of the attachment sockets, wherein a coupling pin is arranged on or in the convex bearing surface and configured to enter one of the attachment openings to couple the attachment stud to the seat rail; and a locking pin configured to enter the respective other attachment opening through a through hole in the attachment stud and thereby lock the attachment stud to the seat rail.

According to another aspect of the invention, an aircraft has a seat rail system according to the invention installed in an interior space of the aircraft.

The invention is inspired by ball-and-socket type joints and pursues the idea to create form-fit ball interfaces on top of a rail, each interface having two complementarily curved surfaces, which enable the provision of two coupling holes, e.g., under 90 degrees, that can be used to attach seats and other installations to the seat rail. The rail can thus be provided as a closed (i.e., not slotted or slit) profile, which provides benefits with regards to corrosion. Due to the specific arrangement of the two pins, basically only sheer loads and no tensile loads act on the connection. The elements can be plugged and/or screwed, for example, which means that the system can feature snap-and-click functionality for installation. The present solution is slim and elegant and enables reductions in weight and the number of components. The mating surfaces can be provided by shaping metal in an appropriate vein, e.g., by milling or by forming the metal under application of temperature and/or pressure, possibly as part of a hybrid solution on top of an underlying rail body of a different material.

Advantageous embodiments and improvements of the present invention are found in the subordinate claims.

According to an embodiment of the invention, the two coupling openings may be embedded in each concave bearing surface under a relative orientation angle of substantially 90° with respect to a center of a spheroid defined by the respective concave bearing surface.

According to an embodiment of the invention, the coupling pin may be configured movable perpendicularly into and out of the through hole in the attachment stud with respect to an extending direction of the through hole such that the locking pin pushes the coupling pin perpendicularly out of the through hole and into the respective attachment opening when inserted into the through hole.

The coupling pin may be integrated in the attachment stud such that it can only move within a predefined range into and out of the attachment stud. The coupling pin may be retained at defined endpoints of this range. In a specific embodiment, the coupling pin may be provided with a spring element, e.g., a cylinder spring, that defines a preload, which acts on the coupling pin pushing it into the through hole. The spring preload may then be overcome by pushing the locking pin into the through hole and thereby forcing the coupling pin out of the through hole. However, it is to be understood that the coupling pin may be configured differently in other embodiments, e.g., as a screw, or as a fixed knop arranged on an outer surface of the attachment stud and integrally formed with the same.

According to an embodiment of the invention, the locking pin may be configured as a ball lock pin.

Ball lock pins allow quick and easy joining and fastening of components and workpieces. Pressing a button in the head of the pin releases a ball lock allowing the pin to be pushed through a hole in the parts to be joined. When the spring loaded button is released, the balls lock automatically making the fastening inseparable. As the balls are unlocked without tools by means of a press button, these devices are called self-locking. Ball lock pins are extremely resistant to shear and corrosion as they are optimally protected against wear.

According to an embodiment of the invention, the seat rail system may further comprise a seat connection rod configured to oppositely extend from the attachment stud with respect to the coupling pin substantially along an axial direction defined by the coupling pin.

The seat connection rod thus may offer a direct load path between the seat or other attached installation and the coupling pin and thus the seat rail.

According to an embodiment of the invention, the seat connection rod may be swivably connected to the attachment stud or integrally formed with the attachment stud.

In one particular example, the seat connection rod may be coupled to the attachment stud via a fork attachment. In this embodiment, the attachment stud may be provided with a double eye or fork on an upper side, to which the attachment stud can be coupled, e.g., via a joint axis that runs through the eyes of the attachment stud.

In an alternative embodiment however, the attachment stud may also be formed together with the seat connection rod as a single piece component. Both components may also be joined to or fused with each other in a substance/material bonded vein, e.g., by welding. Hence, the present invention does not necessarily require a fork-like attachment contrary to many conventional solutions, which leads to further simplifications in the design and reductions in weight.

According to an embodiment of the invention, the attachment stud may have a plurality of convex bearing surfaces circumferentially arranged around a rotation disk, which is rotatably mounted to the connection rod.

The invention hence may enable "movable seat connections", that is, the attachment point of the seat or other installation to the seat rail may be simply rolled along the seat rail by rotating the rotation disk at the attachment stud across the seat rail. Rearranging seats or other installations may thus become particularly simple and effortless.

According to an embodiment of the invention, the attachment openings of each respective concave bearing surface may be arranged along a respective line horizontally rotated with respect to the longitudinal extension of the seat rail.

This implies that the attachment stud may be installed at the seat rail slightly rotated along a vertical axis. As a consequence, the attachment sockets can be placed much closer to each other along the seat rail. Or, in other words, the raster pitch of the seat rail can be minimized leading to greater flexibility with regards to the positioning of seats and other installations. Bringing the attachment sockets as close as possible to each other may also help in case of the movable seat connection mentioned further above based on a rotatable disc of convex bearing surfaces.

According to an embodiment of the invention, the attachment stud may comprise titanium and/or steel or another suitable substantially corrosion-free material at the convex bearing surface. Similarly, the attachment sockets may comprise titanium and/or steel or another suitable substantially corrosion-free material at the concave bearing surface.

Titanium and steel come in particularly strong yet lightweight variants and/or alloys that combine high corrosion resistance with outstanding strength-to-density ratio. Titanium and steel components or portions of components can be shaped using superplastic forming By heating up the material, it becomes soft, hence processes that are usually used on plastics can be applied, such as thermoforming, blow forming, and vacuum forming, just to name a few examples. At least the mating interfaces of the rail system can thus be made from superplastically deformed titanium and/or steel and may be integrated in a suitable metal profile or a hybrid configuration of different metals or other materials. In one specific exemplary variant, the attachment stud may be formed from steel while the rail is formed from titanium.

BRIEF DESCRIPTION OF THE DRAWINGS

The invention will be explained in greater detail with reference to exemplary embodiments depicted in the drawings as appended.

The accompanying drawings are included to provide a further understanding of the present invention and are incorporated in and constitute a part of this specification. The drawings illustrate the embodiments of the present invention and together with the description serve to explain the principles of the invention. Other embodiments of the present invention and many of the intended advantages of the present invention will be readily appreciated as they become better understood by reference to the following detailed description. The elements of the drawings are not necessarily to scale relative to each other. In the figures, like reference numerals denote like or functionally like components, unless indicated otherwise.

Although specific embodiments are illustrated and described herein, it will be appreciated by those of ordinary skill in the art that a variety of alternate and/or equivalent implementations may be substituted for the specific embodiments shown and described without departing from the scope of the present invention. Generally, this application is intended to cover any adaptations or variations of the specific embodiments discussed herein.

DETAILED DESCRIPTION OF THE PREFERRED EMBODIMENTS

Figure 1:
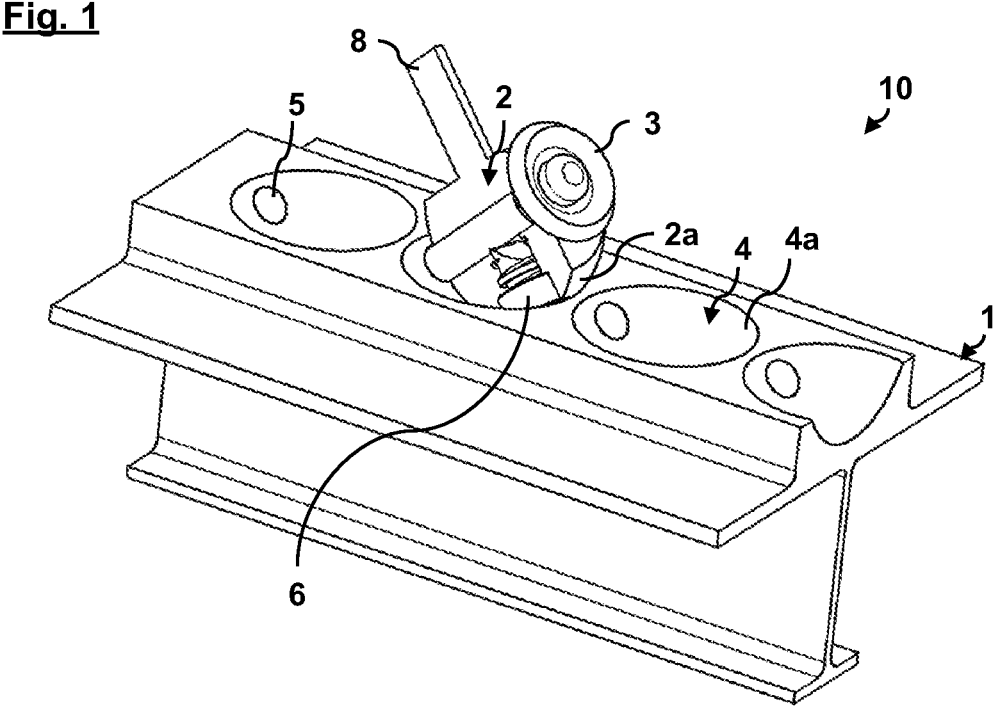
FIG. 1 schematically depicts a perspective view of a seat rail system according to an embodiment of the invention.
Figure 8:
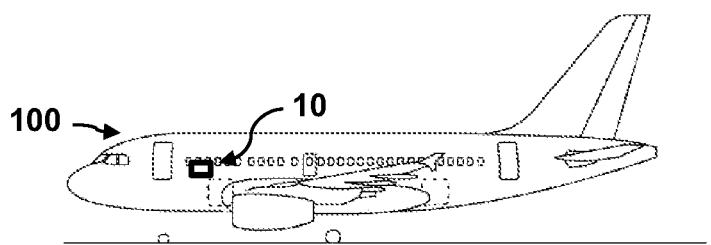
FIG. 8 schematically shows an aircraft having one of the seat rail systems of FIGS. 1 to 7 installed in an interior space of the aircraft.

FIG. 1 schematically depicts a perspective view of a seat rail system 10 according to an embodiment of the invention. The seat rail system 10 may be used to attach one or several seats or other components, installations and/or monuments within an interior space of a vehicle. For example, the seat rail system 10 may be used to attach passenger seats to a floor within a passenger cabin of a passenger aircraft 100, as it is exemplarily shown in FIG. 8.

The seat rail system 10 comprises an elongated seat rail 1 having a T-like profile, which may be mounted on or in a floor of the aircraft 100 between several floor panels (not shown) such that an upper side of the T-profile rests flush with an upper side of the floor panels. The seat rail 1 may be integrally formed from a single metal, metal alloy and/or other metal material. In one particular example, the seat rail 1 may be formed at least in parts from aluminum (e.g., as an extruded and milled profile). In another example, the seat rail 1 may be formed at least in parts from a titanium alloy (e.g., by forming sheet metal). However, the seat rail 1 may also be provided as a hybrid and/or composite component and different portions of the component may be formed from different materials or be based on different productions processes or steps. For example, a body or base of the seat rail 1 may be formed from aluminum while a crown of the seat rail 1 may be adapted for long-life usage and thus be formed from titanium for increased resistance against corrosion and scratches.

The seat rail 1 is provided with several attachment sockets 4 in a linear arrangement on an upper side of the seat rail 1, the row of attachment sockets 4 running along a longitudinal extension of the seat rail 1. Each attachment socket 4 has an at least partly spheroid concave bearing surface 4a. The concave bearing surfaces 4a may be formed in the rail 1 based on a superplastic forming process, in which at least an upper portion of the rail 1 is formed by heating and shaping a titanium alloy accordingly.

Two coupling openings 5 are worked into each concave bearing surface 4a under a relative orientation angle of 90° with respect to a center of a spheroid defined by the respective concave bearing surface 4a. Both coupling openings 5 are provided to receive pins or bolts or the like under 90° relative to each other in a sheer connection for optimal load transmission between the attached seat and the floor.

As can be seen in FIG. 1, an attachment stud 2 is mounted to one of the attachment sockets 4. The attachment stud 2 is used to attached a seat or other component to the seat rail 1 and thus to the floor of the aircraft 100. The attachment stud 2 is shown in more detail in FIGS. 2 and 3.

The attachment stud 2 has an at least partly spheroid or cylindroid convex bearing surface 2a with a curvature corresponding to a curvature of the concave bearing surface 4a of the attachment sockets 4. The convex bearing surface 2a of the attachment stud 2 serves as a complementary formed mating surface for the concave bearing surface 4a of the attachment socket 4. In one example, the convex bearing surface 2a may follow the shape of a sphere. Alternatively, the convex bearing surface 2a may follow the shape of a cylinder, which may be more simple to manufacture. For example, a cylindric shape may be formed by milling. The more complex spherical shape may require more elaborate manufacturing processes, e.g., super plastic forming or additive manufacturing.

A coupling pin 6 is integrated in the attachment stud 2 in a movable fashion such that it protrudes from the convex bearing surface 2a in an extended position. In a retracted position, the coupling pin 6 may be substantially received within the attachment stud 2 and only slightly protrude from the convex bearing surface 2a. To this end, the coupling pin 6 may comprise, in one embodiment, a spring 12 that is preloaded against a retainer ring 13 such that the coupling pin 6 is pushed to the inside of the attachment stud 2 (cf., arrow in FIG. 2).

The coupling pin 6 is configured to enter one of the coupling openings 5 to couple the attachment stud 2 to the seat rail 1. To this end, the attachment stud 2 may be placed on the respective attachment socket 4, whereby the convex bearing surface 2a of the attachment stud 2 is brought in contact with the concave bearing surface 4a of the attachment socket 4. Due to the matching curvatures of both surfaces 2a, 4a, the attachment stud 2 may be easily slid along the surface of the attachment socket 4 until the coupling pin 6 engages one of the respective coupling openings 5. To this end, the coupling pin 6 may slightly protrude from the convex bearing surface 2a of the attachment stud 2 in the retracted position.

The seat rail system 10 further comprises a locking pin 3 configured to enter the respective other coupling opening 5 through a through hole 7 in the attachment stud 2 and thereby lock the attachment stud 2 to the seat rail.

Figure 2:
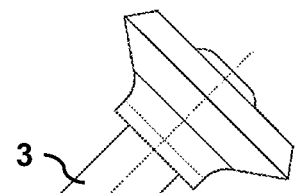
FIGS. 2 and 3 schematically depict detailed cross-sectional views of an attachment stud and a locking pin of the seat rail system of FIG. 1 during installation.
Figure 3:
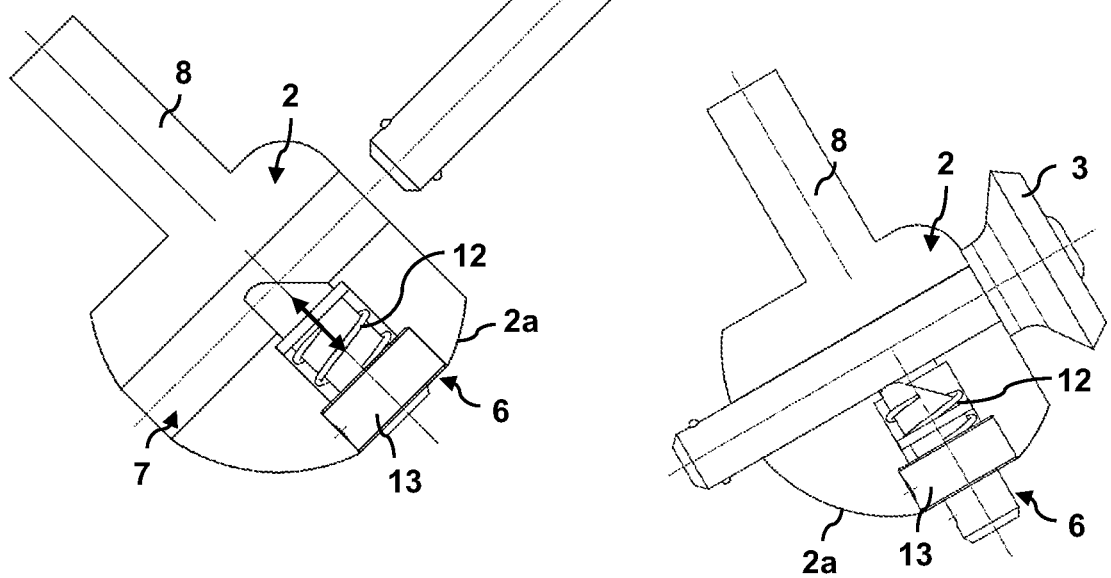

In the exemplary embodiment of FIGS. 1 to 3, the locking pin 3 is a ball lock pin to keep the installation process as simple as possible. A button in the head of the pin 3 may be pressed, which then releases a ball lock allowing the pin 3 to be pushed through the through hole 7 and into one of the coupling holes 5. When the spring loaded button is released, the balls may lock automatically with an appropriate portion of the coupling hole 5 (not shown) and thereby lock the pin 3 and thus the attachment stud 2 to the seat rail 1.

As can be seen in FIGS. 2 and 3, the coupling pin 6 is configured movable perpendicularly into and out of the through hole 7 in the attachment stud 2 with respect to an extending direction of the through hole 7. This means that the locking pin 3 pushes the coupling pin 6 (preloaded by its spring 12) perpendicularly out of the through hole 7 and into the respective coupling opening 5 when being inserted into the through hole 7 (cf. FIG. 3).

The system 10 thus offers an easy to use snap & click installation. First, the attachment stud 2 is placed on the respective attachment socket 4 and moved across its the concave bearing surface 4a until the coupling pin 6 clicks into the respective coupling opening 5. Next, the locking pin 3 is introduced in the respective other coupling opening 5 through the through hole 7 of the attachment stud 2, which then automatically pushes the coupling pin 6 fully into the respective coupling opening 5, thereby snapping the attachment stud 2 tight in the attachment socket 4.

A seat connection rod 8 oppositely extends from the attachment stud 2 with respect to the coupling pin 6 along an axial direction defined by the coupling pin 6. In the exemplary embodiment of FIGS. 1 to 3, the seat connection rod 8 is integrally formed with the attachment stud 2, e.g., by welding or by an additive manufacturing process. The seat connection rod 8 serves as a connection to a respective seat or other installation and provides a direct load path between the cabin component and the seat rail 1 and thus the floor of the aircraft 100. A fork attachment is not used in this embodiment, which means that the embodiment of FIGS. 1 to 3 can be kept lightweight and simple. Moreover, eccentricity moments can be eliminated compared to more conventional solutions.

Figure 4:
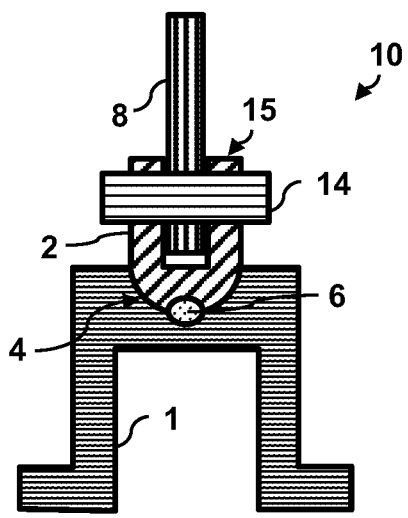
FIG. 4 schematically depicts a lateral cross-sectional view of a seat rail system according to another embodiment of the invention.

However, also variants with a fork attachment are possible and may be preferred. An exemplary embodiment is shown in FIG. 4 in a lateral cross-sectional view and in FIG. 5 in a longitudinal cross-sectional view. In this case, the seat rail 1 has a different shape, namely an omega profile, which may be formed using a thin and high strength sheet metal, e.g., titanium, providing the seat rail 1 with particular advantages with regards to corrosion and weight-strength-ratio. Longitudinally running stiffening portions may be joined to the seat rail 1, for example, by laser welding.

Like the embodiment of FIGS. 1 to 3, also this seat rail 1 may be provided with linearly arranged attachment sockets 4 having an at least partly spheroid concave bearing surface 4a. The concave bearing surface 4a may be formed in the seat rail 1, for example, by superplastic forming after the basic omega profile has been shaped. The coupling openings 5 may be stamped, for example, or cut by a laser.

Figure 5:
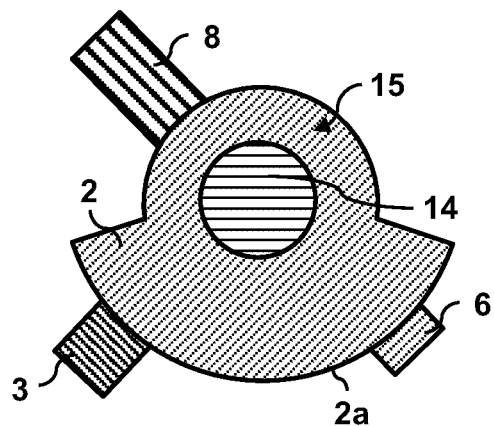
FIG. 5 schematically depicts a detailed longitudinal cross-sectional view of the seat rail system of FIG. 4.

The attachment stud 2 may be formed similarly to the one described with reference to FIGS. 1 to 3. Hence, the attachment stud 2 also has a convex bearing surface 2a, e.g., spherical, for coupling the attachment stud 2 to the attachment sockets 4. The attachment stud 2 may be formed from corrosion-free steel or also titanium. In contrast to the embodiment of FIGS. 1 to 3 however, the attachment stud 2 is configured with a joint fork 15 on an upper side. The seat connection rod 8 is attached to the attachment stud 2 via a joint axis 14, which in turn is mounted in the joint fork 15. As can be seen in FIG. 5 in particular, the joint axis 14 can be located at the intersection of the coupling pin 6 and the locking pin 3, which enables an extremely light structure.

Figure 6:
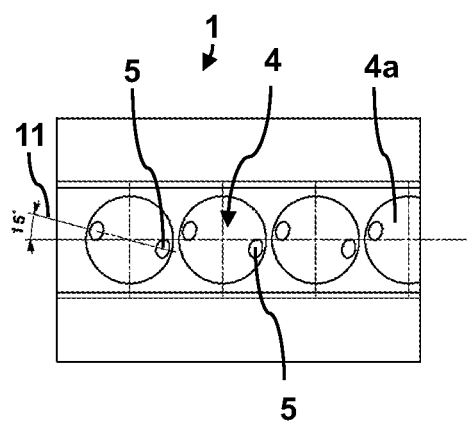
FIG. 6 schematically depicts a top view of a seat rail of a seat rail system according to another embodiment of the invention.

In order to provide a fine raster pattern of attachment points, the attachment sockets 4 can be brought as close together as possible, leaving only minimal distances between the sockets 4 along the seat rail 1. In the embodiment of FIGS. 1 to 3 the coupling openings 5 are all oriented along a single line running in the longitudinal direction of the seat rail 1. However, in other embodiments the coupling openings 5 of each respective concave bearing surface 4a may be aligned along a respective alignment line 11 horizontally rotated with respect to the longitudinal extension of the seat rail 1, as exemplarily shown in FIG. 6. The coupling openings 5 of adjacent attachment sockets 4 are thus horizontally shifted away from each other with respect to the extension direction of the seat rail 1, thereby providing additional installation space for each attachment socket 4. In one particular example, the alignment line 11 may be rotated by an angle of 15° with respect to the longitudinal extension of the seat rail 1.

Figure 7:
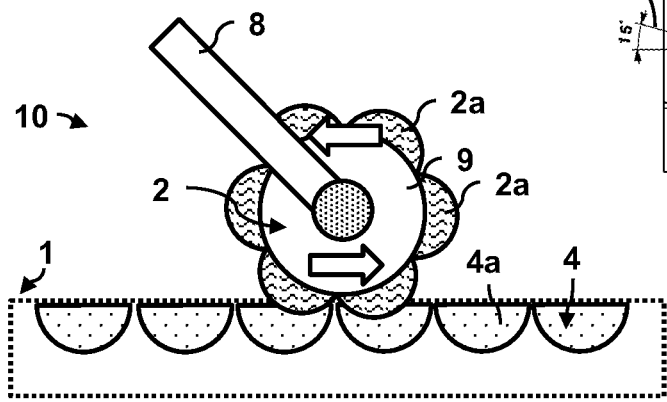
FIG. 7 schematically depicts a cross-sectional view of a seat rail system according to another embodiment of the invention.

Referring now to FIG. 7, an alternative embodiment of the seat rail system 10 is depicted, in which the seat connection rod 8 is also not integrally formed with and/or joined to the attachment stud 2. Instead, the seat connection rod 8 is also swivably connected to the attachment stud 2 similarly to the embodiment of FIGS. 4 and 5, e.g., via a fork or similar element. In this particular embodiment, the attachment stud 2 has a plurality of convex bearing surfaces 2a circumferentially arranged around a rotation disk 9, which is rotatably mounted to the seat connection rod 8.

As indicated by the arrows in FIG. 7, the attachment stud 2 may thus be rotated around an axis defined by the attachment line of the seat connection rod 8. The attachment stud 2 may thus be rolled along the seat rail 1 by pushing or pulling the seat connection rod 8 accordingly. Along the way, the convex bearing surfaces 2a of the attachment rod 8 sequentially enter respective attachment sockets 4 of the rail 1. Hence, the embodiment provides a movable arrangement for connecting seats and other installations to the floor of an aircraft. The seat connection rod 8 may be connected to a respective seat or other monument, which may then be pushed or drawn along the seat rail 1 until a convenient installation position is found. Once such a position is found, the locking pin 3 is plugged into the respective coupling opening 5, thereby also locking the coupling pin 6 in the respective other coupling opening 5.

The invention thus provides a scratch resistant and non-corrosive form fit interface with minimal eccentricity moments and the potential for moveable seat connections.

In the foregoing detailed description, various features are grouped together in one or more examples or examples with the purpose of streamlining the disclosure. It is to be understood that the above description is intended to be illustrative, and not restrictive. It is intended to cover all alternatives, modifications and equivalents. Many other examples will be apparent to one skilled in the art upon reviewing the above specification. The embodiments were chosen and described in order to best explain the principles of the invention and its practical applications, to thereby enable others skilled in the art to best utilize the invention and various embodiments with various modifications as are suited to the particular use contemplated.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

LIST OF REFERENCE SIGNS

1 seat rail
2 attachment stud
2a convex bearing surface
3 locking pin
4 attachment socket
4a concave bearing surface
5 coupling opening
6 coupling pin
7 through hole
8 seat connection rod
9 rotation disk
10 seat rail system
11 alignment line
12 spring
13 retainer ring
14 joint axis
15 joint fork
100 aircraft

The invention claimed is:
1. A seat rail system for an interior space of a vehicle, comprising:
  a seat rail having a plurality of attachment sockets arranged in a row along a longitudinal extension of the seat rail, wherein each attachment socket has an at least partly spheroid concave bearing surface, wherein two coupling openings are embedded in each concave bearing surface;
  an attachment stud having an at least partly spheroid or cylindroid convex bearing surface with a curvature corresponding to a curvature of the concave bearing surface of the attachment sockets, wherein a coupling pin is arranged on or in the convex bearing surface and configured to enter one of the coupling openings to couple the attachment stud to the seat rail; and
  a locking pin configured to enter the respective other coupling opening through a through hole in the attachment stud and thereby lock the attachment stud to the seat rail.

2. The seat rail system according to claim 1, wherein the two coupling openings are embedded in each concave bearing surface under a relative orientation angle of substantially 90° with respect to a center of a spheroid defined by the respective concave bearing surface.

3. The seat rail system according to claim 1, wherein the coupling pin is configured movable perpendicularly into and out of the through hole in the attachment stud with respect to an extending direction of the through hole such that the locking pin pushes the coupling pin perpendicularly out of the through hole and into the respective coupling opening when inserted into the through hole.

4. The seat rail system according to claim 1, wherein the locking pin is configured as a ball lock pin.

5. The seat rail system according to claim 1, further comprising a seat connection rod configured to oppositely extend from the attachment stud with respect to the coupling pin substantially along an axial direction defined by the coupling pin.

6. The seat rail system according to claim 5, wherein the seat connection rod is swivably connected to the attachment stud or integrally formed with the attachment stud.

7. The seat rail system according to claim 5, wherein the attachment stud has a plurality of convex bearing surfaces circumferentially arranged around a rotation disk, which is rotatably mounted to the seat connection rod.

8. The seat rail system according to claim 1, wherein the coupling openings of each respective concave bearing surface are arranged along a respective alignment line horizontally rotated with respect to the longitudinal extension of the seat rail.

9. The seat rail system according to claim 1, wherein the attachment stud comprises at least one of titanium or steel at the convex bearing surface and the attachment sockets comprise at least one of titanium or steel at the concave bearing surface.

10. An aircraft having a seat rail system according to claim 1 installed in an interior space of the aircraft.

* * * * *